United States Patent
Hope et al.

(10) Patent No.: US 7,225,831 B2
(45) Date of Patent: Jun. 5, 2007

(54) FLUID FLOW CONTROL VALVE

(75) Inventors: Rodney C. Hope, Sugar Land, TX (US); Donald J. Winnike, Houston, TX (US); Thomas B. Thrash, Jr., Houston, TX (US)

(73) Assignee: Gilmore Valve Co., Ltd., Houston, TX (US)

( * ) Notice: Subject to any disclaimer, the term of this patent is extended or adjusted under 35 U.S.C. 154(b) by 193 days.

(21) Appl. No.: 10/604,494

(22) Filed: Jul. 25, 2003

(65) Prior Publication Data

US 2005/0016597 A1 Jan. 27, 2005

(51) Int. Cl.
*F16K 15/02* (2006.01)
*F16K 1/44* (2006.01)

(52) U.S. Cl. .................. 137/516.27; 251/334

(58) Field of Classification Search ........... 137/516.27, 137/516.29; 251/334, 359
See application file for complete search history.

(56) References Cited

U.S. PATENT DOCUMENTS

| | | | |
|---|---|---|---|
| 1,679,779 A * | 8/1928 | Oberhuber | 251/334 |
| 2,481,713 A * | 9/1949 | Bertea | 137/516.27 |
| 2,969,951 A | 1/1961 | Walton | |
| 3,433,250 A * | 3/1969 | Hagihara | 251/334 |
| 3,861,646 A | 1/1975 | Douglas | |
| 4,846,216 A * | 7/1989 | Raymond | 137/516.27 |
| 4,949,746 A | 8/1990 | Kay | |
| 5,326,079 A * | 7/1994 | Ferrando et al. | 251/359 |
| 5,893,389 A | 4/1999 | Cunningham | |
| 6,125,822 A | 10/2000 | Janik et al. | |
| 6,651,693 B2 * | 11/2003 | Simmons et al. | 137/516.27 |

* cited by examiner

*Primary Examiner*—John Rivell
(74) *Attorney, Agent, or Firm*—Blackwell Sanders Peper Martin LLP; Lawrence E. Evans, Esq.

(57) ABSTRACT

A fluid flow control valve that may be used as both a check valve and a relief valve. The valve includes a moveable valve member having a surface capable of forming two or more valve seal areas with two or more valve seat surfaces on a valve seat member. The valve seat surfaces may be formed by coining a portion of valve seat surfaces on fingers of the valve seat member. One of the valve seat fingers in inclined from the outlet toward the inlet. The valve seat member is metal, forming a metal to metal valve seat arrangement with the valve seat member.

27 Claims, 3 Drawing Sheets

FLUID FLOW CONTROL VALVE

BACKGROUND OF INVENTION

The present invention relates to fluid flow control valves that can be used as a check valve or relief valve which are sometimes referred to as non-return valves. These valves are hereinafter collectively referred to as a self-closing valve or valve. The valve is operable at both low and high pressure fluid operation and is adapted for operation at elevated temperatures.

Self-closing valves of the check and relief valve types are well known in the art. Additionally, self-closing valves with metal to metal sealing arrangements for the movable valve element are also known in the art. An example of such a valve can be found in U.S. Pat. No. 5,893,389. The valve disclosed in the '389 patent has two separate sealing areas; one effective for sealing at relatively low pressure and the other seal area being effective for sealing at a relatively high pressure. This particular patent also illustrates some prior art metal seal arrangements.

It is important to provide a good sealing engagement between the movable vale element and the sealing surface or sealing surfaces of the valve seat(s). In the mass production of self-closing valves, such seats require precision machining and assembly so that a part may be used in combination with other parts and still effect good sealing engagement without custom fitting of parts. Such precision fitting of parts is a particular problem when a valve is designed to operate at both high and low pressures utilizing two distinct sealing areas.

There is thus a need for an improved self-closing valve that eliminates one or more deficiencies of the prior art.

SUMMARY OF INVENTION

The present invention involves the provision of a self-closing valve of the check valve or relief valve type that utilizes formed-to-fit valve seat sealing surfaces providing a low pressure seal distinct from a high pressure seal with both sealing surfaces being replaceable.

The present invention also involves the provision of a self-closing valve that can be operated at high temperatures by the utilization of metal-to-metal sealing areas.

The present invention also involves the provision of an annular valve seat finger that is normally inclined toward an inlet of the valve.

The present invention further involves the provision a self-closing valve that can be easily formed by the manufacturer by deforming, through coining, of portions of the fingers forming the valve seat seal areas.

BRIEF DESCRIPTION OF DRAWINGS

Like numbers throughout the various Figures designate like or similar parts.

DETAILED DESCRIPTION

Figure 3:
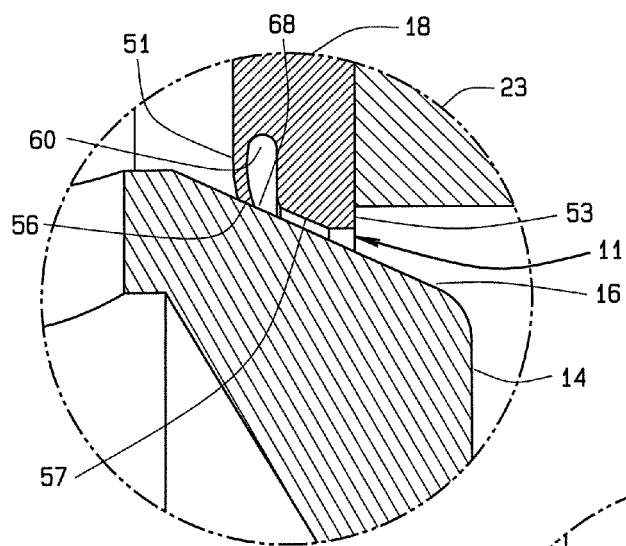
FIG. 3 is a fragmentary sectional view of the area generally designated two of FIG. 1 showing the valve member seated against the valve seat for a low pressure application.
Figure 4:
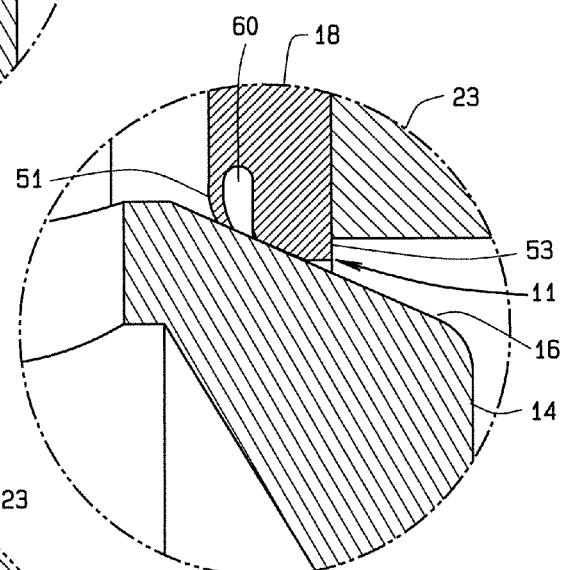
FIG. 4 is a view similar to FIG. 3 showing the valve member in sealing engagement with two distinct valve seat areas showing sealing under high pressure operating conditions.

The reference numeral 1 designates generally a valve with a valve body 3 having a flow passage 4 therethrough formed by one or more throughbores 5 in the valve body. The flow passage 4 extends between an inlet 7 and an outlet 8 (inlet and outlet are used in the sense of normal working fluid flow). The valve 1 includes a valve seat arrangement designated generally 11 that is operable to selectively allow flow of fluid from the inlet 7 to the outlet 8 through the flow passage 4 and to prevent flow of fluid from the outlet 8 to the inlet 7. The valve 1 is a self-closing valve and can be of a check valve or relief valve type. Check valves and relief valves generally function the same way with a relief valve generally venting to the atmosphere or to a tank or reservoir of fluid. Check valves are usually connected in a working line that can be pressurized with working fluid on either side of the valve seat arrangement and allows flow from the inlet to the outlet and precludes flow from the outlet to the inlet. The valve 1 further includes a movable valve element or member 14 that has a valve seat surface portion 16 (FIGS. 3, 4). The valve seat surface 14 is a portion of the valve seat arrangement 11. The valve seat arrangement 11 further includes a valve seat member 18 that is selectively engaged with the valve element 14 to selectively permit and preclude flow of fluid through the flow passage. The valve element 14 is movable between closed and open positions and is preferably urged toward the closed position by a force applying a biasing element 21 such as a resiliently deformable coil spring or Belleville washers. It is to be understood however that the biasing element 21 for check valve operation, may be or include pressurized fluid in an outlet flow passage portion 19 of the flow passage 4.

The valve body 3, as shown, comprises an inlet housing portion 23 and an outlet housing portion 25. The outlet flow passage portion 19 is contained within the outlet housing portion 25 and the inlet flow passage portion 27 is contained within the inlet portion 23. It is preferred that the housing portions 23, 25 be selectively separable as by having threaded engagement at 31. While it is shown that the housing portion 25 has a male threaded coupling portion 28 and the housing portion 23 has a female threaded coupling portion 29, an alternate embodiment can have these threaded portions reversed wherein the male threaded portion would be on the housing portion 23 and the female threaded portion on the housing portion 25.

The valve 1 is provided with a valve member chamber 33 adapted for receipt therein of the valve member 14. The valve member 14 is movable within the chamber 33 axially or in a direction generally longitudinally of the valve 1 and generally longitudinally of the flow passage 4. The chamber 33 has a stop shoulder 37 adapted to limit the amount of travel of the valve member 14 within the chamber 33 toward the outlet 8. Additionally, the fit between the valve member 14 and the cylindrical side surface 35 defining the chamber 33 is of close tolerance to maintain the valve member generally centrally located along the longitudinal axis of the valve 1 and allow for smooth movement. In the illustrated structure, the biasing element 21, which is shown as a coil spring, is contained within a chamber 45 in a cylindrical housing 46 of the valve member 14 and is seated against the shoulder 37 and a shoulder 47 in the valve member 14. The biasing element 21 is operable to apply a force to the valve member 14 to induce movement of the valve member to urge it to move toward the valve seat member 18. The K factor and preload of the biasing element 21 are selected to provide for the correct amount of force to be applied by the valve seating surface 16 against the valve seat member 18. The K factor, pre-load of the biasing element plus pressure in the outlet passage 19 determine the force required to move the valve from a closed position to a more open position. It is to be noted that the force from the biasing element 21 and force from the pressure in the outlet passage 19 are selected to determine whether the surface 16 seats against one or both surfaces 56, 57 of the fingers 51, 53. As seen, the valve member 14 has a plurality of flow openings 49 that allow flow from the inlet flow passage portion 27 through the valve member 14 and then to the outlet flow passage portion 19 through the chamber 45 of the valve member 14. If the pressure at the inlet 7 is relieved, the valve member 14 will move to its closed position under the influence of at least the biasing element 21. When the valve 1 is used as a check valve, the pressure of the fluid at the outlet 8 will induce movement of the valve member 14 to a closed position thus allowing the valve 1 to function as check valve. To function as a relief valve, the pressure at the inlet 7 would be sufficient to move the valve to an open position against the force of a mechanical biasing element 21 and allow fluid to flow from the inlet 7 to the outlet 8 and to a reservoir, tank or atmosphere as desired. The finger 51 is elastically or resiliently deformable within its normal range of movement during operation of the valve 1. The longitudinal axes of the valve member 14 and the valve seat member 18 are coaxial.

As best seen in FIGS. 3, 4, the valve seat member 18 cooperates with the valve seating surface 16 on the valve member 14 to form the valve seat arrangement 11 providing at least two spaced apart and distinct valve seats and at least two distinct valve closed positions with sealing at each closed position. The valve seat member 18, as shown, is in the form of a metal valve seal ring formed as an annular ring having first and second longitudinally spaced annular fingers 51, 53 extending radially inwardly from the outer periphery 55 to provide first and second sealing surfaces 56, 57 respectively to selectively seat and seal against the seating surface 16. Additional fingers and sealing surfaces may be provided if desired. The first annular finger 51 may be used on its own to provide sealing engagement with the valve seating surface 16 for relatively low pressure applications (FIG. 3). The first and second annular fingers, 51, 53 respectively, or at least the second annular finger 53 may be used to provide sealing engagement with the seating surface 16 for relatively high pressure applications (FIG. 4). The fingers 51, 53 surround and are spaced apart along the longitudinal axis of the portion of the flow passage 4 at the valve seat member 18. The annular groove 60 is positioned between the fingers 51, 53 with an open inner side 61 opening into the flow passage 4.

Figure 1:
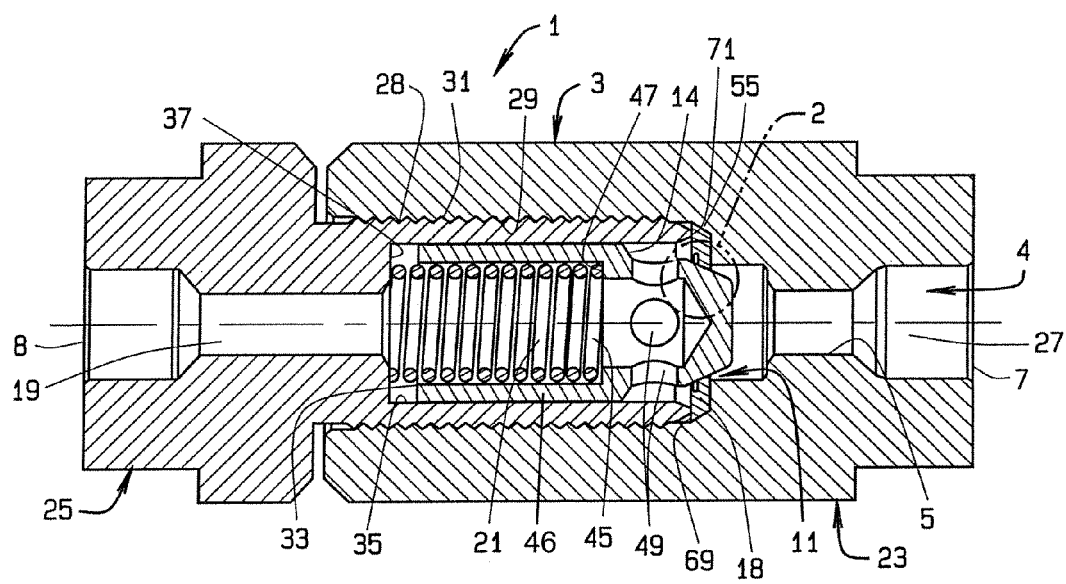
FIG. 1 is a sectional view of a self-closing valve showing the valve element in sealing engagement with both valve seats.
Figure 2:
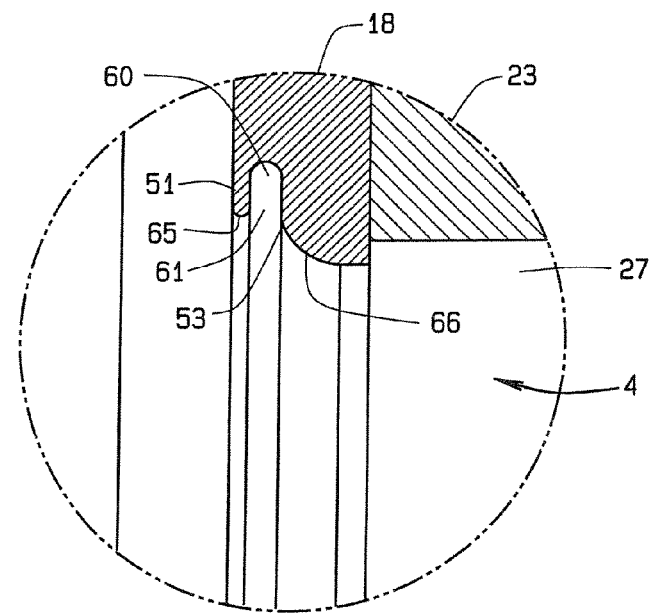
FIG. 2 is an enlarged fragmentary view of the area designated to FIG. 1. The views of the valve seat shown prior to the sealing areas being formed.

Prior to manufacture (FIG. 2), the first and second annular fingers 51, 53 each have a free end portion 65, 66, respectively, that is formed and shaped in a manner that they may be coined by application of force thereto by the seating surface 16 or other suitable coining or forming device. It is preferred that the coining of the end portions 65, 66 of the first and second annular fingers 51, 53 be by forced engagement with the seating surface 16 of the valve member 14 to be used within the respective valve 1. In a preferred embodiment, the end portions 65, 66 of the first and second annular fingers 51, 53 are arcuate, rounded or otherwise suitably shaped to provide material to coin. The end portions 65, 66 are coined on the downstream side to match the contour of the seating surface 16. As seen in FIG. 2, the end of the annular finger 51 has a half round shape in cross section. The shape of the end portion 65 is selected to help prevent a burr or the like from forming at the upstream corner 68 (FIG. 3) of the finger 51 during coining. The valve seat member 18 is carried by the valve body 3 and in particular the valve portion 23 as by being pressed fit therein or slip fit therein. Preferably the mounting of the valve seat member 18 in the valve body 3 is such as to be replaceable for repair. The valve seat member 18 can also be held in place and sealed to the valve portions 23, 25 via an axially directed force applied by the male threaded portion 31 to the valve seat member 18 as at 69 securing it in place between valve portion 23, 25. Contact between the free end 71 of the portion 28 also seals the threaded engaging portions of the portions 28, 29 and the valve seat member 18 to the housing portion 23.

Figure 5:
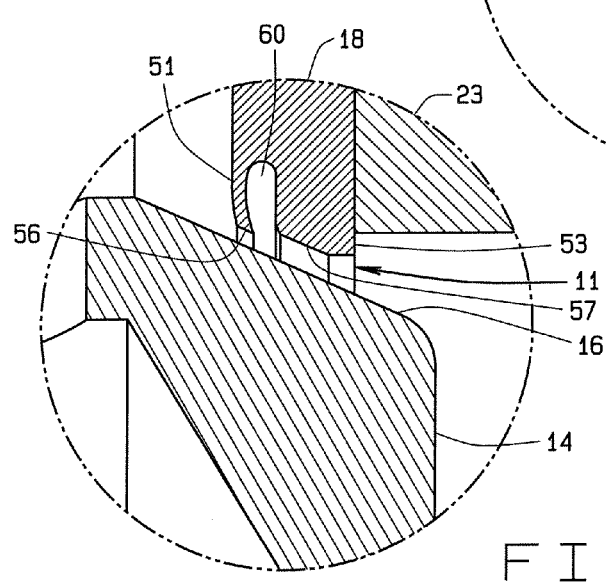
FIG. 5 is a view similar to FIG. 3 showing the valve member in an open position for allowing fluid throw through the valve.
Figure 6:
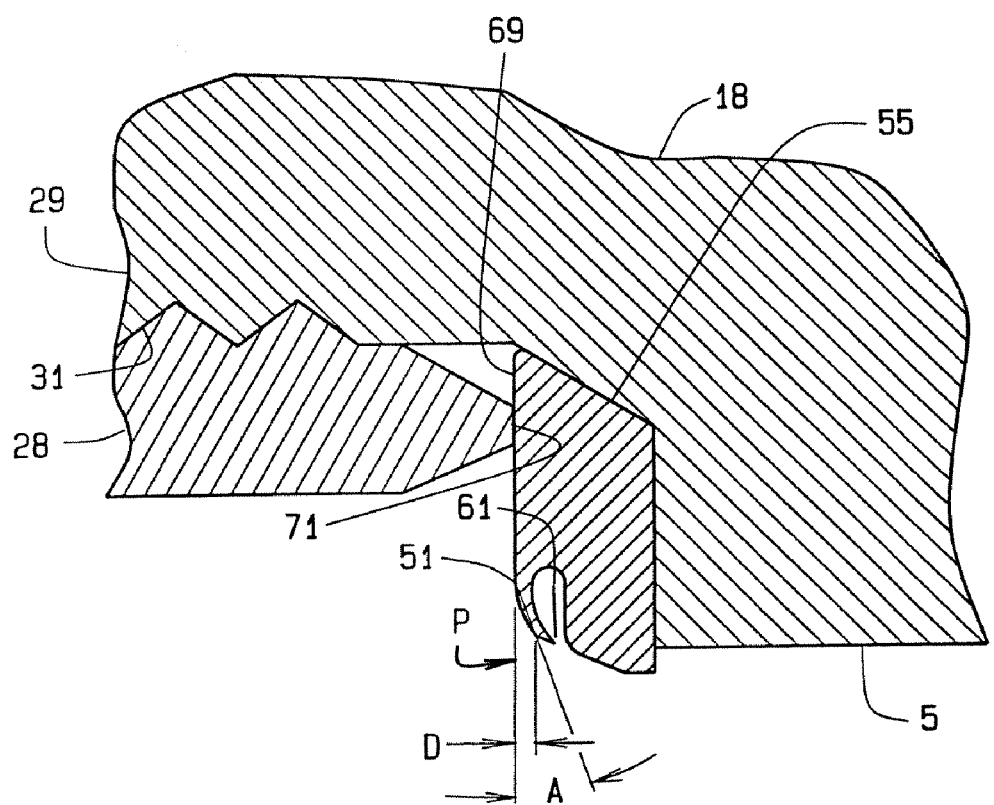
FIG. 6 is an enlarged schematic view of a valve seat to illustrate incline of the finger.

The material from which the valve seat member 18 is formed, has a yield strength such that under the desired forming (coining) force, the free ends 65, 66 of the fingers 51 and 53 may be deformed or coined, to match the contour of the valve seating surface 16 to produce made to fit mating surfaces. Sealing engagement for one mode of low pressure check valve operation is shown in FIG. 3. Sealing engagement for one mode of high pressure operation as a check valve is shown in FIG. 4. FIG. 2 shows the valve seat member 18 as manufactured and prior to coining of the end portions 65, 66 of the annular fingers 51, 53. Force adequate to coin the fingers 51, 53 is applied during the manufacturing process and preferably with the valve seat member 18 in place in the valve body 3. The valve seating surface 16 engages the ends 65, 66 of the metal fingers 51, 53 with adequate force and for an adequate time to coin the fingers to form seal surfaces 56, 57 matched or mated to the surface 16. In coining of the downstream annular finger 51 the annular finger is also permanently deformed, i.e., bent beyond its elastic limit to incline to an upstream position toward the finger 53 as best seen in FIG. 5. However, there is still enough spring back after the formation of the incline to insure good sealing contact between the coined surface 56 and the seating surface 16. Also, in a low pressure seating position as seen in FIG. 3, upstream fluid pressure will apply a force inside the groove 60 to help ensure good sealing engagement between the surfaces 16 and 56. Thus, the downstream annular finger 51 is both flexible, i.e., resiliently deformable, but has been permanently deformed both at the end and along its length or radial dimension. If desired, the finger 51 may be machined to the inclined orientation. The incline distance, D, of the finger 51 is preferably at least about 0.010 inches at the free end and preferably at least about 0.015 inches at the free end from a transverse plane P. The angle A, FIG. 6, from a transverse plane P is at least about 5 degrees and preferably at least about 10 degrees.

Self-closing can be accomplished by pressure on the normally downstream side of the valve element 14 and/or from the biasing force applied by the use of a spring or the like as the biasing element 21. In a preferred embodiment of the present invention, the valve 1 may be assembled either partially or completely and the surface 16 forced into engagement with the annular fingers 51, 53. The force is adequate to effect coining of the end portions 65, 66 on the ends of the fingers 51 and 53. In this formation step, the finger 51 is also bent somewhat towards the upstream side or the inlet end of the valve 1 with some permanent deformation resulting, i.e., permanently bent to the inclined condition. The force on the valve member 14 is then relieved and the valve is ready for use. The force may be applied by applying fluid pressure to the downstream side or the outlet end 8 of the valve 1. The force may also be applied through a mechanical device, for example, a rod, inserted through the outlet end to apply the deforming force to the valve member 14 and hence the annular fingers 51, 53. The valve seat member 18 may also have the fingers 51, 53 coined without assembling the valve completely. The force may be applied to the valve member 14 and to the valve seat member 18 in a holding jig, for example, in a hydraulic press. After coining of the finger, 51, 53 and bending of the finger 51, the valve 1 may be assembled. The material comprising the valve seal ring is chosen for its yield strength, i.e., the force required to deform or coin the ends of the annular fingers as well as its ability to resiliently deform when moving the finger 51 from its low pressure seating position to its high pressure seating position with the finger 51 having mechanical properties sufficient to allow it to return to its low pressure seating position without further permanent deformation, i.e., exceeding its elastic limit. A material for making the valve seat member 18 is preferably a metal and it has been found that Inconel® 625 has been particularly effective. It is preferred that the yield strength of the valve member 14 in the area of the surface 16 have a higher yield strength than the yield strength of the valve seat member 18 so that it does not coin or otherwise deform during the formation of the coined ends 56, 57 and preferably thereafter. A preferred material for the valve member 14 is tungsten carbide with 10% nickel.

The valve 1 is operable in various modes of operation as either a check valve or a relief valve. In check valve operation, there will be downstream back pressure urging the valve member 14 towards its closed position. The valve may be used as a check valve by the surface 16 engaging only the finger 51 or by engaging both the fingers 51 and 53. Whether one or both fingers is engaged will be determined by the back pressure, the force supplied by the spring functioning as a biasing element 21, if used, and the force required to deflect the finger 51 to a position to allow the surface 16 to engage the surface 57. Additionally, a spring biasing element 21 may be operable to have force applied thereby to the valve member 14 adjustable. In relatively low or relatively high pressure operation, the surface 16 may seat against either or both of the surfaces 56, 57. For example, in low or high pressure operation the surface 16 may be in engagement only with the surface 56 and, in high pressure operation the surface 16 may be in connect with both the surfaces 56, 57. In the opening of the valve, when used as a check valve the pressure at the inlet 7 must overcome the force applied by a spring biasing element 21 and the back pressure in the outlet 8. If only the surface 56 is used for sealing with the surface 16, the valve member 14 moves to an open position upon the application of an overcoming force applied by the fluid pressure in the inlet 7. If both the surfaces 56, 57 are engaged with the surface 16 a first initial but lower force will move the valve member to a partially open position whereby there is sealing still provided by engagement of the surfaces 16, 56. An increase in force will then move the valve member 14 to a fully open position as see in FIG. 5. The additional force is required because of the additional force provided by the increase in force applied by the spring 21 as it is compressed during movement of the valve member 14. When the valve 1 is used as a relief valve, normally, there is no fluid back pressure except for that provided by the atmosphere will not change the applied force as the valve member 14 is moved to a downstream position or toward an opening direction. Again, spring biasing element 21 and the construction of the finger 51 are such that sealing may be accomplished engaging the surface 16 only with the surface 56 or by engaging the surface 16 with both surfaces 56, 57. In the event sealing engagement is only effected between surfaces 16, 56 a single opening pressure is used to move the valve member 14 from its closed position to an open position. If sealing is accomplished by use of both surfaces 56, 57 against the surface 16 an initial pressure will move the valve member 14 toward its downstream and open position but an increase in force will be required to overcome the increased compressive force in the spring biasing element 21. Thus, an increase opening force from original starting of the opening movement will be needed to effect opening of the valve. Thus, a wide variety of operating conditions can be accommodated in a single valve by the proper selection of the valve seat member 18 and in particular the finger 51 in combination with biasing element 21 when it is a spring or the like. When the valve is used as relief valve, it is sometimes preferable to replace a coil spring biasing element 21 with one or more Belleville washers, either individually or a plurality of Belleville washers. When the valve is used as a check valve and the valve member 14 may engage either the finger 51 or both fingers 51, 53 a lower opening pressure would be required to break the sealing engagement between the surfaces 53, 16 and a relatively high pressure would be required to break the sealing engagement between the surface 16 and the surfaces 56, 57. When the valve is used as a relief valve, and it is set up for having the sealing surface 16 engage only with the sealing surface 56, as with the check valve, only a single operating pressure is required to move the valve 14 from its closed position to an open position. When the valve 1 is set up to be used as a relief valve with both surfaces 56, 57 in engagement with the surface 16, a relatively high pressure is required to move the valve member 14 firstly from its sealing engagement with the surface 57 and at higher pressure than that to move the surface 16 out of sealing engagement with the surface 56. The use of a spring biasing element 21 in the valve 1 when the valve is used as a relief valve, the spring provides the principal closing force during operation to keep the valve 1 in its closed condition. When the valve 1 is used as a check valve, particularly for high pressure applications, the principal force to keep the valve in its closed condition is applied by the back pressure of the fluid as opposed a spring biasing element 21. If the force applied by a spring biasing element 21 is substantially less than the force applied by the back pressure of the fluid in the outlet 8, it can be practically considered that only a single force is required to open the valve member 14.

During operation of the valve 1, the valve member 14 moves in response to a force differential in a direction from the high force side to the low force side. Force in the axial direction can be applied by fluid pressure, a resilient biasing element 21 and force from deformation of the finger 51. It is the net force that will make the valve member 14 move. The valve may be constructed such that when unpressurized, the closing and opening force (they are equal) is relatively low when the valve member 14 is seated only on finger 51, and with the same parts, the opening and closing forces are relatively high when the valve member 14 is seated against both fingers 51, 53. When the valve 1 is pressurized and the valve member 14 is sealing engagement with the finger 51 and not the finger 53 the opening force is within a first pressure range and, with the same parts, when the valve member is sealed against the fingers 51, 53, the opening force may be in a second force range that includes part of the first range. A portion of the second range is higher than the first range.

It will be appreciated that the above description relates to the preferred embodiments by way of example only. Many variations on the apparatus for delivering the invention will be obvious to those knowledgeable in the field, and such obvious variations are within the scope of the invention as described and claimed, whether or not expressly described.

The invention claimed is:

1. A self closing valve comprising:
   a valve body having a flow passage therethrough;
   a metal valve seal ring having first and second sealing surfaces disposed within the valve body about a portion of the flow passage;
   a valve member mounted within the flow passage for movement between an open position and at least one of at least two closed positions, the valve member having a seating surface for engagement with at least one of the sealing surfaces of the metal valve seal ring in at least one of the closed positions;
   a biasing element associated with the valve member for urging the valve member toward the closed positions; and
   the metal valve seal ring being formed as an annular ring having first and second annular fingers extending radially inwardly of the flow passage portion to provide first and second sealing surfaces spaced apart along the longitudinal axis of said portion of flow passage, the first annular finger being normally inclined toward the second annular finger and the first and second sealing surfaces each being coined to each provide a surface portion for mating with a respective portion of the seating surface for selective sealing engagement therewith when the valve member is in a respective at least one of the closed positions.

2. The valve of claim 1 wherein the seating surface of the valve member and the first sealing surface of the metal valve seal ring are in sealing engagement when force applied to the valve member is within a first force range.

3. The valve of claim 2 wherein the seating surface of the valve member and the first and second sealing surfaces of the metal valve seal ring are in sealing engagement when the force applied to the valve member is within a second force range at least a portion of which second force range is different than the first force range.

4. The valve of claim 1 wherein the first and second annular fingers of the metal seal ring extend radially inwardly and have a surface on their respective inner end that was coined by contact with the valve member seating surface.

5. The valve of claim 4 wherein the incline of the first annular finger of the metal seal ring was formed by permanently bending the first annular finger toward the second annular finger.

6. The valve of claim 1 wherein the incline of the first annular finger of the metal seal ring was formed by permanently bending the first annular finger toward the second annular finger.

7. A self closing valve comprising:
   a valve body having flow passage therethrough;
   a metal valve seal ring having first and second sealing surfaces disposed within the valve body about a portion of the flow passage;
   a valve member mounted within the flow passage for movement between an open position and at least one of at least two closed positions, the valve member having a seating surface for engagement with at least one of the sealing surfaces of the metal valve seal ring in at least one of the closed positions;
   a biasing element associated with the valve member for urging the valve member toward the closed positions;
   the metal valve seal ring being formed as an annular ring having first and second annular fingers extending radially inwardly of the flow passage portion to provide first and second sealing surfaces spaced apart along the longitudinal axis of said portion of the flow passage, the first and second sealing surfaces each being coined to each provide a surface portion for mating with a respective portion of the seating surface for selective sealing engagement therewith when the valve member is in a respective at least one of the closed positions; and
   the first annular finger of the metal seal ring is resiliently deformable and is inclined toward the second annular finger.

8. The valve of claim 7 wherein the seating surface of the valve member and the first sealing surface of the metal valve seal ring are in sealing engagement and the seating surface of the valve member and second sealing surface of the metal valve seal are not in sealing engagement when opening force applied to the valve member is within a first force range.

9. The valve of claim 8 wherein the seating surface of the valve member and the first and second sealing surfaces of the metal valve seal are in sealing engagement when opening force applied to the valve member is within a second force range, at least a portion of the second force range is different than the first force range.

10. A metal valve seal ring for a valve comprising:
    an annular ring having first and second annular fingers extending radially inwardly from an outer perimeter to provide a first sealing surface on the first annular finger and a second sealing surface on the second annular finger;
    the first annular finger being resiliently deformable within its range of movement in a valve and inclined toward the second annular finger; and
    the first and second sealing surfaces having been formed by coining.

11. A metal valve seal ring for a valve comprising:
    an annular ring having first and second annular fingers extending radially inwardly from an outer perimeter to provide a first sealing surface on the first annular finger and a second sealing surface on the second annular finger; and
    the first annular finger being resiliently deformable within its range of movement in a valve and being normally inclined toward the second annular finger.

12. The metal valve seal ring of claim 11 wherein the first annular finger incline having been formed by bending the first annular finger.

13. A check valve comprising:
    a valve body having a flow passage therethrough,
    a metal valve seal ring having first and second sealing surfaces disposed within the valve body about a portion of the flow passage;
    a valve member mounted within the flow passage for movement between an open position and at least one of at least two closed positions, the valve member having a seating surface for engagement with at least one of the sealing surfaces of the metal valve seal ring in at least one of the closed positions; and
    the metal valve seal ring being formed as an annular ring having first and second annular fingers extending radially inwardly of the flow passage portion to provide first and second sealing surfaces spaced apart along the longitudinal axis of said portion of flow passage, the first annular finger being normally inclined toward the second annular finger and the first and second sealing surfaces each being coined to each provide a surface portion for mating with a respective portion of the seating surface for selective sealing engagement therewith when the valve member is in a respective at least one of the closed positions.

14. The check valve of claim 13 wherein the seating surface of the valve member and the first sealing surface of the metal valve seal ring are in sealing engagement when opening force on the valve member fluid pressure is relatively low.

15. The check valve of claim 14 wherein the seating surface of the valve member and the first and second sealing surfaces of the metal valve seal ring are in sealing engagement when opening force on the valve member is relatively high.

16. A check valve comprising:
a valve body having a flow passage therethrough,
a metal valve seal ring having first and second sealing surfaces disposed within the valve body about a portion of the flow passage;
a valve member mounted within the flow passage for movement between an open position and at least one of at least two closed positions, the valve member having a seating surface for engagement with at least one of the sealing surfaces of the metal valve seal ring in at least one of the closed positions;
the metal valve seal ring being formed as an annular ring having first and second annular fingers extending radially inwardly of the flow passage portion to provide first and second sealing surfaces spaced apart along the longitudinal axis of said portion of the flow passage, the first and second sealing surfaces each being coined to each provide a surface portion for mating with a respective portion of the seating surface for selective seating engagement therewith when the valve member is in a respective at least one of the closed positions; and
the first annular finger of the metal seal ring is resiliently deformable and is inclined toward the second annular finger.

17. The check valve of claim 16 wherein the seating surface of the valve member and the first sealing surface of the metal valve seal ring are in sealing engagement when opening force on the valve member is relatively low.

18. The check valve of claim 17 wherein the seating surface of the valve member and the first and second sealing surfaces of the metal valve seal ring are in sealing engagement when opening force on the valve member is relatively high.

19. A relief valve comprising:
a valve body having a flow passage therethrough;
a metal valve seal ring having first and second sealing surfaces disposed within the valve body about a portion of the flow passage;
a valve member mounted within the flow passage for movement between an open position and at least one of two closed positions, the valve member having a seating surface for engagement with at least one of the sealing surfaces of the metal valve seal ring in at least one of the closed positions;
a spring associated with the valve member for urging the valve member toward the closed positions;
the metal valve seal ring being formed as an annular ring having first and second annular fingers extending radially inwardly of the flow passage portion to provide first and second sealing surfaces spaced apart along the longitudinal axis of said portion of the flow passage, the first and second sealing surfaces each being coined to each provide a surface portion mating with a respective portion of the seating surface for selective seating engagement therewith when the valve member is in a respective at least one of the closed positions: and
the first annular finger of the metal valve seal ring is resiliently deformable and is normally inclined toward the second annular finger.

20. The relief valve of claim 19 wherein the seating surface of the valve member and the first sealing surface of the metal valve seal ring are in sealing engagement when opening force on the valve member is within a first force range.

21. The relief valve of claim 20 wherein the seating surface of the valve member and the first and second sealing surfaces of the metal valve seal ring are in sealing engagement when opening force on the valve member is within a second force range at least a portion of the second force range is greater than the first force range.

22. A self closing valve comprising:
a valve body having a flow passage therethrough;
a metal valve seal ring having first and second sealing surfaces disposed within the valve body about a portion of the flow passage;
a valve member mounted within the flow passage for movement between an open position and at least one of at least two closed positions, the valve member having a seating surface for engagement with at least one of the sealing surfaces of the metal valve seal ring in at least one of the closed positions;
a biasing element associated with the valve member for urging the valve member toward the closed positions; and
the metal valve seal ring being formed as an annular ring having first and second annular fingers extending radially inwardly of the flow passage portion to provide first and second sealing surfaces spaced apart along the longitudinal axis of said portion of flow passage, the first annular finger being normally inclined toward the second annular finger and the first and second sealing surfaces each providing a surface portion for mating with a respective portion of the seating surface for selective sealing engagement therewith when the valve member is in a respective at least one of the closed positions.

23. The valve of claim 22 wherein the first annular finger is inclined at a normal angle of incline of at least about 5°.

24. The valve of claim 23 wherein the normal angle of incline is at least about 10°.

25. The valve of claim 22 wherein the first and second annular fingers of the metal seal ring extend radially inwardly and have a surface on their respective inner end that was coined by contact with the valve member seating surface.

26. The valve of claim 25 wherein the incline of the first annular finger of the metal seal ring was formed by permanently bending the first annular finger toward the second annular finger.

27. The valve of claim 22 wherein the incline of the first annular finger of the metal seal ring was formed by permanently bending the first annular finger toward the second annular finger.

* * * * *